United States Patent
Crelier

Patent Number: 6,151,703
Date of Patent: Nov. 21, 2000

[54] DEVELOPMENT SYSTEM WITH METHODS FOR JUST-IN-TIME COMPILATION OF PROGRAMS

[75] Inventor: Regis Crelier, Santa Cruz, Calif.

[73] Assignee: Inprise Corporation, Scotts Valley, Calif.

[21] Appl. No.: 08/650,512

[22] Filed: May 20, 1996

[51] Int. Cl.$^7$ ..................................................... G06F 9/44
[52] U.S. Cl. ........................................ 717/5; 717/6; 717/7
[58] Field of Search ................................ 395/705; 717/5, 717/6, 7

[56] References Cited

U.S. PATENT DOCUMENTS 5,768,593  6/1998  Walters ..................................... 395/705

OTHER PUBLICATIONS

Gosling, J., and McGilton, H., *The Java Environment: A White Paper*, Sun Microsystems, Inc., Oct. 1995.

JAVA: The First 800 Days, Sun Microsystems Inc website http://java.sun.com/events/jibe/timeline.html, Jun. 3, 2000.

JAVA On Solaris 2.6 A White Paper, Sun Microsystems Inc., 1997.

JAVA JIT Compiler Overview Sun Microsystems Inc. http://www.sun.com/solaris/jit, Jun. 21, 2000.

Design and Implementation of Pep, a JAVA Just–In–Time Translator, O Agesen, Theory and Practice of Object Systems v2, No. 2 pp. 127–155, 1997.

"Vlatte: A JAVA VM Just–In–Time Scheduling Compiler" Mass Laboratory, Seoul National University, http://latte.snu.ac.kr/vlatte, Jun. 20, 2000.

Latte: A Fast and Efficient Java VM Just–in–Time Compiler, Mass Laboratory, Seoul National University, http://latte.snu.ac.kr, Jun. 20, 2000.

Welcome to Micro–Architecture and System Software Laboratory Mass Laboratory, Seoul National University, http://altair.snu.ac.kr/, Jun. 20, 2000.

Electrical Fire A Compiler for the JAVA platform, mozilla.org wysiwyg://26/http://www.mozilla.org/projects/ef/, Jun. 20, 2000.

"Java Code Brews For Embedded Apps", Sreeram Duvuurru Electronic Engineering Times n 932, p. 70, Dec. 16, 1996.

Borland Announces Availability of Borland CH Development Suite 5.0 Business Wire, Mar.26, 1996.

JAVA Unleashed, Michael Morrison et al. Macmillan Computer Pub, ISBN 1575210495, Apr. 12, 1996.

(List continued on next page.)

*Primary Examiner*—Tariq R. Hafiz
*Assistant Examiner*—Todd Ingberg
*Attorney, Agent, or Firm*—John A. Smart

[57] ABSTRACT

A development system having a client which employs a virtual machine for executing programs written in the Java programming language is described. The client executes a "compiled" (i.e., bytecode or pseudo-compiled) Java program, which has been created by compiling a Java source code program or script with a Java compiler. The pseudo-compiled program comprises the bytecode emitted by the compiler. The development system further includes a just-in-time compiler which natively compiles each pseudo-compiled method of a Java program on a "just-in-time" basis—that is, compiles each method as it is actually used into native machine code for a target microprocessor. Methods which are unused are left uncompiled (i.e., left as bytecode). During program execution, when a method call is made from interpreted code, the system employs an "invoker" slot of the callee. When a method call is made from compiled code, the system employs a "compiled code" slot of the callee. As the addresses for the slots themselves remain unchanged, a method which has been compiled need not be recompiled when a callee method it invokes is itself compiled. In this manner, a method (caller) calling another method (callee) need not know whether it is calling is an interpreted method or a compiled method.

23 Claims, 7 Drawing Sheets

OTHER PUBLICATIONS

SPiCE: A System for Translating Smalltalk Programs Into a C Environment, IEEE Transactions on Software Engineering V21 No. 11, Nov. 1996.

Brihi: an Optimizing Java Compiler, M. Cierniak et al, University of Rochester, IEEE, 1997.

Object Share Company Press Release, Visual Works 5i http://www/objectshare.com, Jun. 19, 2000.

Compiling JAVA Just In Time, IEEE Micro pp. 36–43, T. Cramer et al., 1997.

The JAVA Hotspot Performance Engine Architecture p. 1–13 http://java.sun.com/products/hotspot/whitepaper.html, Apr. 1999.

CS265 "Expert " p.: Just In Time Compilers, Matt Welsh, UC Berkeley, http://www.CS.berkeley.edu/~mdw/class/cs265/, Feb. 14, 2000.

Dynamic Compilation, Westley Weiner: CS 265 Topic UC Berkeley, http:www.cs.berkeley.edu/~weiner/cs265.html, Jun. 21, 2000.

Not Just Making Smalltalk—Parcplare will move beyond signature products with plug in support for Alternative Technology p. 83 Computer Tech., May 27, 1996.

Parc Place Thraws In Smalltalk Towel; Heads For Java, Network Briefing, Jul. 23, 1997.

Hot Spot At Center of Sun Java Plans, Electronic News Jim De Tar, Sep. 1, 1997.

Analysis and Compilation of Object Oriented Languages, http://www.csd.uv.se/~thomas/wpo/oo–compilation–papers.html, Jun. 21, 2000.

Feedback—Directed Compilation http://www.cs.berkeley.edu/~richie/cs265/feedback/, Jun. 21, 2000.

Design, Implementation, and Evaluation of Optimizations in a Just–In–Time Compiler, K. Ishizaki et al, No Date.

FIG. 6

DEVELOPMENT SYSTEM WITH METHODS FOR JUST-IN-TIME COMPILATION OF PROGRAMS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to creating and executing application programs and other software and, particularly, to methods for improved execution of such programs in a distributed environment.

With the explosive growth of the Internet and the World Wide Web, an ever-increasing number of computers of disparate platforms are being connected together. As a result, there is renewed interest in distributing software in binary format which operates in this ever-increasing heterogeneous environment.

Porting programs from one platform to another has always been problematic, however. In the recent past, for example, developers relied on programming languages which were "relatively portable," such as ANSI C, for developing software applications. While some degree of portability can be achieved using C, minute differences between platforms (even between dialects of UNIX) mandate that the software be recompiled for the particular operating environment where the software application is to be deployed.

In the early 1990s, a team at Sun Microsystems developed a new language, "Java," to address the issues of software distribution on the Internet. Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations.

A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed into heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

The bytecodes are actually stored in "class" files. Each class file stores all the information for a particular Java class. A "class" in Java is a software construct which defines instance variables and methods, in effect, serving as a template for creating objects of a particular type. In this regard, a Java class is akin to a C++ class. A very simple "Point" class, for instance, may be declared as follows.

```
class Point {
    public double x; /* instance variable */
    public double y; /* instance variable */
}
```

This declaration serves as a template from which "Point" objects can be instantiated.

Actual instantiation of an object occurs in a manner similar to that found in the C++ programming language. For example, a variable which refers to a "Point" object can be declared as follows:

Point myPoint;

An instance of a point object is allocated as follows.

myPoint=new Point ( );

Here, one can now access variables of the "Point" object, using familiar "dot" notation for referring to the names of the variables.

myPoint.x=10;

myPoint.y=20;

Objects communicate by sending messages to each other. A recipient object responds to a message by selecting a particular method to execute. If one object wants another object to do some work on its behalf, for instance, the first object sends a message to the second object. The second object, in response, invokes the method which is appropriate for processing the message. The methods themselves, therefore, define the behavior of objects instantiated from a class. In particular, it is an object's methods which manipulate the object's data—its instance variables.

Further description of the Java Language environment can be found in Gosling, J. et al., *The Java Language Environment: A White Paper*, Sun Microsystems Computer Company, October 1995, the disclosure of which is hereby incorporated by reference.

Relying on a runtime interpreter for execution, Java applications execute notoriously slow. One approach to improving the execution performance of a Java application is to pre-compile the application's bytecode into native machine code for a particular platform and store that code in the corresponding class file. The approach has distinct disadvantages, however. For instance, the class file now becomes machine dependent, since it incorporates machine code for a particular platform. As there are many different platforms available, it is not practical to include compiled machine code in a class file for each and every platform.

There are other disadvantages. Including pre-compiled code within the class file itself leads to a much larger class file, even when just a single platform is targeted. As Java applications are largely targeted for Internet deployment, increased program size is highly undesirable: increased download times result. As another disadvantage, pre-compiled code potentially compromises security. Although the Java environment provides built-in security, such security checks are performed on Java bytecode. There are no provisions for checking code once it is no longer in bytecode format. As yet another disadvantage, pre-compiled code is not position independent (i.e., positioned in system memory). In order to relocate pre-compiled code at runtime, memory address fix-ups are required. This stems from the fact that the system does not know beforehand where (i.e., what memory address) the pre-compiled code will be loaded into system memory. Although it is relatively straightforward to do such fix-ups, the overhead incurred with such an operation is highly undesirable.

What is needed is a development system which provides the benefits of compiling Java applications into native machine code, yet without the disadvantages attendant with pre-compilation approaches. The present invention fulfills this and other needs.

SUMMARY OF THE INVENTION

A development system of the present invention includes a client which employs a virtual machine for executing programs written in the Java programming language. The client executes a "compiled" (i.e., bytecode or pseudo-compiled) Java program, which has been created by compiling a Java source code program or script with a Java compiler. Here, the Java source code program is an application program written in the Java programming language. The program comprises objects created from Java classes; each class defines data and methods for the class. The pseudo-compiled program comprises the bytecode emitted by the compiler. The virtual machine includes a runtime interpreter for interpreting the Java bytecode program. During operation, the client simply requests the virtual machine to execute a particular Java compiled program.

The development environment or system is modified to include a just-in-time compiler. In an exemplary environment, the just-in-time compiler comprises a Dynamic Link Library (DLL) which is loaded at runtime by the virtual machine. When the virtual machine loads for the first time, it loads the just-in-time compiler. The client, however, is not aware of the just-in-time compiler.

The just-in-time compiler compiles each method of a Java program on a "just-in-time" basis—that is, it compiles each method as the method is actually used. Here, methods which are unused are left uncompiled. In a preferred environment, a method is compiled upon its first invocation. This holds true even if the method is known to execute only once. Even though a method may execute only once, it is possible that the method itself includes code which would benefit from compiling into native machine code; examples of such code include loops and other similar programming constructs. All subsequent use invokes the compiled version of the method.

Each method is associated with a method block or descriptor. Each method block is modified so that a method (caller) calling another method (callee) does not have to know whether it is calling is an interpreted method or a compiled method. Specifically, the sytem of the present invention employs modified calling slots in the method block of each method for effecting calls through callback stubs or direct pointers.

In accordance with the present invention, the method blocks of methods are modified for use with the just-in-time compiler as follows. First, an "invoker" slot is employed from all calls from an interpreted caller (or the runtime interpreter) to the callee method (i.e., the method associated with the method block). When the method is compiled, the invoker slot is updated so that, for subsequent calls (from an interpreted caller), the compiled code for the method is executed. Ordinarily, the invoker slot stores a pointer to one of the following callback stub functions: invokeJavaMethod, invokeSynchronizedJavaMethod, invokeAbstractMethod, or invokeLazyNativeMethod. This is extended to also include the following new stub functions: invokeCompiler and invokeCompiledMethod. The invokeCompiler stub address is stored in the invoker slot when the method has yet to be compiled (and compilation has not be disabled). After a method has been compiled, the slot stores the address of the invokeCompiledMethod stub. Thereafter, calls from an interpreted caller to the method will results in invocation of the compiled version of the method, via the invokeCompiledMethod stub.

In the case of calling from compiled code with compilation enabled, a "compiled code" slot is employed. The compiled code slot stores either a pointer (e.g., 32-bit address pointer) to the compiled code of the callee method or, if no compiled code exists, a pointer to an invokeCompiler handler for compiling the callee method. If, on the other hand, compilation is disabled, the slot stores callback stubs which correspond to the "static," "dynamic," and "native" Java methods: CallbackStaticMethod, CallbackDynamicMethod, and CallbackNativeMethod. These stubs call back into the Java runtime interpreter for interpretation of the callee method.

Stated generally, therefore, when calling from interpreted code, the system employs the invoker slot; when calling from compiled code, the system uses compiled code slot. Since the addresses for the slots themselves remain unchanged (as opposed to the address or pointer which each stores), there is no need to patch callers to a method (i.e., at the calling sites) when the method is compiled. As a particular advantage, therefore, the code of any callers to the method need not be modified.

DETAILED DESCRIPTION OF A PREFERRED EMBODIMENT

The following description will focus on the presently preferred embodiment of the present invention, which is embodied as a development system running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

General Architecture

A. System Hardware

Figure 1A:
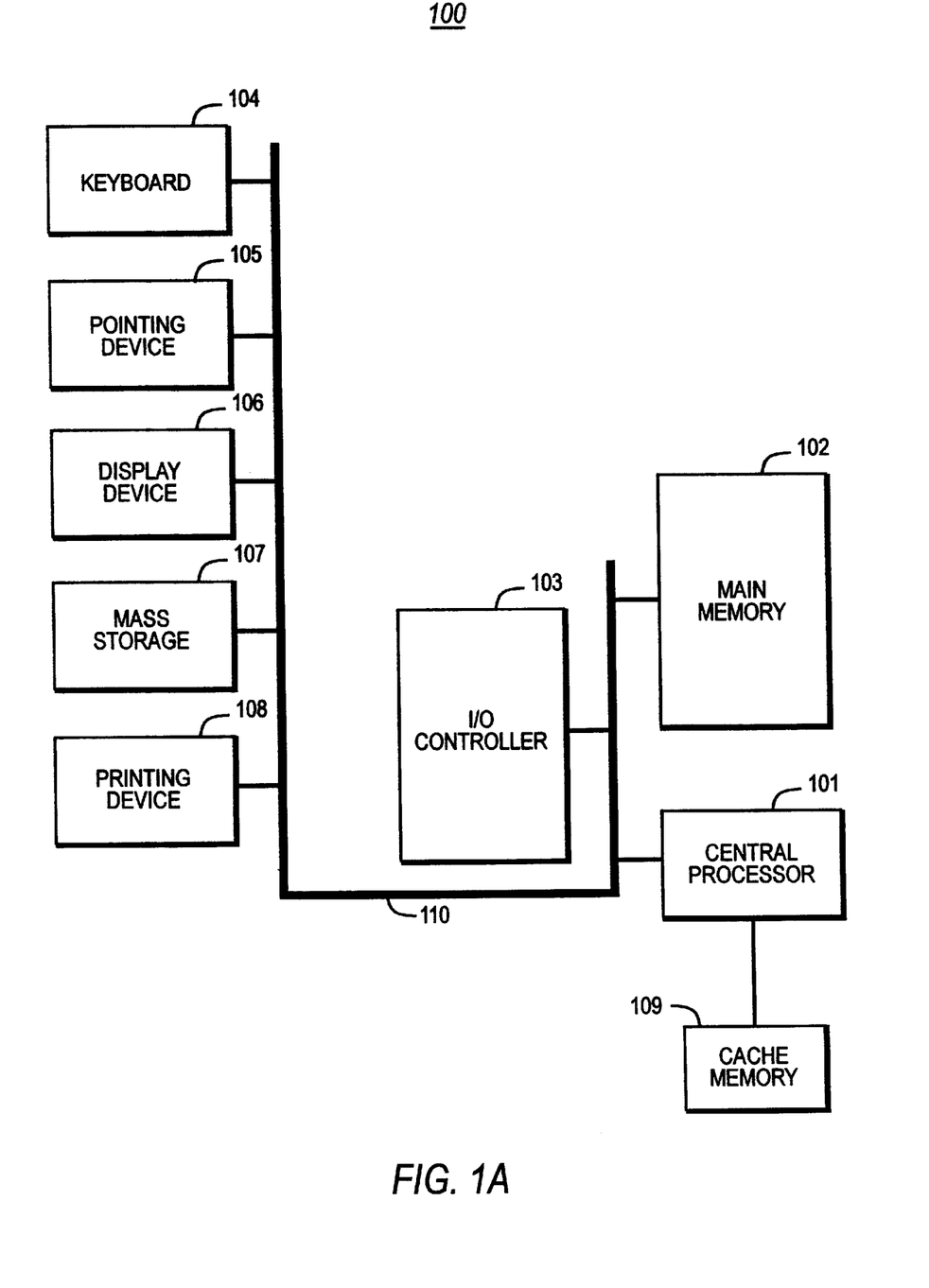
FIG. 1A is a block diagram of a computer system in which the present invention may be embodied.

The present invention may be embodied on a computer system such as the system 100 of FIG. 1A, which includes a central processor 101 (e.g., Intel 80×86 class microprocessor or compatible), a main memory 102, an input/output controller 103, a keyboard 104, a pointing device 105 (e.g., mouse, track ball, pen device, or the like), a display device 106, and a mass storage or disk memory 107 (e.g., removable disk, "floppy" disk, fixed disk, optical disk, and the like). Additional input/output devices, such as a printing device 108, may be provided with the system 100 as desired. As shown, the various components of the system 100 communicate through a system bus 10 or similar architecture.

B. System Software

Figure 1B:
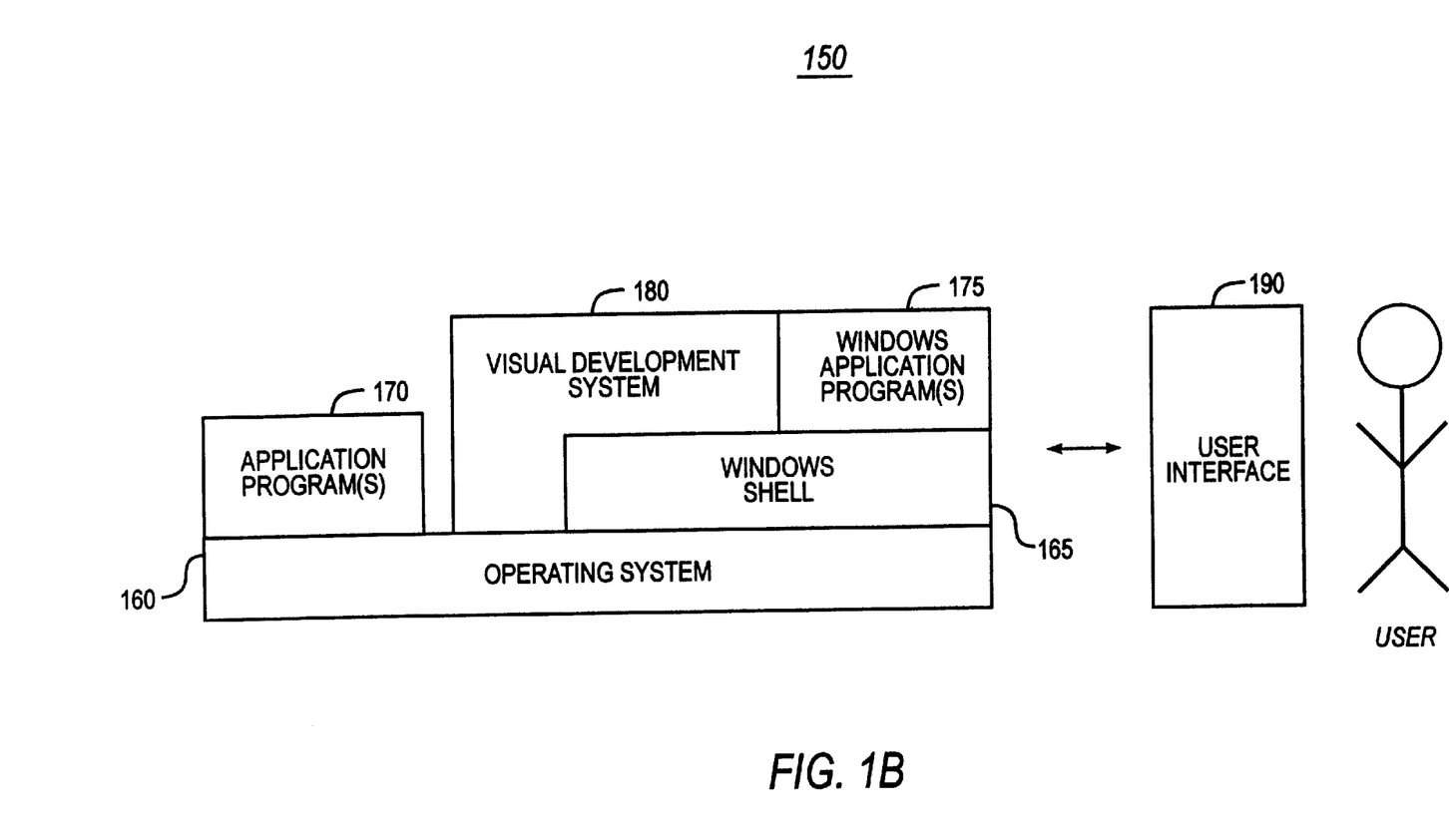
FIG. 1B is a block diagram of a software system for controlling the operation of the computer system of FIG. 1A.

Illustrated in FIG. 11B, a computer software system 150 is provided for programming the operation of the computer system 100. Software system 150, which is stored in system memory 102 and/or on disk memory 107, includes a kernel or operating system (OS) 160 and a windows shell or interface 165. One or more application programs, such as application programs 170 or windows applications programs 175, may be "loaded" (i.e., transferred from storage 107 into memory 102) for execution by the system 100. OS 160 and shell 165, as well as application software 170, 175, include an interface for receiving user commands and data and displaying results and other useful information. Software system 150 also includes a development system 200 of the present invention for developing system and application programs. As shown, the development system 200 includes components which interface with the system 100 through windows shell 165, as well as components which interface directly through OS 160.

In a preferred embodiment, the system 100 includes an IBM-compatible personal computer, available from a variety of vendors (including IBM of Armonk, N.Y.). Operating system 160 and shell 165 is provided by Microsoft® Windows, which is available from Microsoft Corporation of Redmond, Wash. Alternatively, the system 100 may be implemented in other platforms, including Macintosh, UNIX, and the like. Development systems 200 include Borland® C++, version 5.0 available from Borland International of Scotts Valley, Calif. Application software 170, 175, on the other hand, can be any one of a variety of application software, including word processing, database, spreadsheet, text editors, and the like.

C. Development System

Figure 2A:
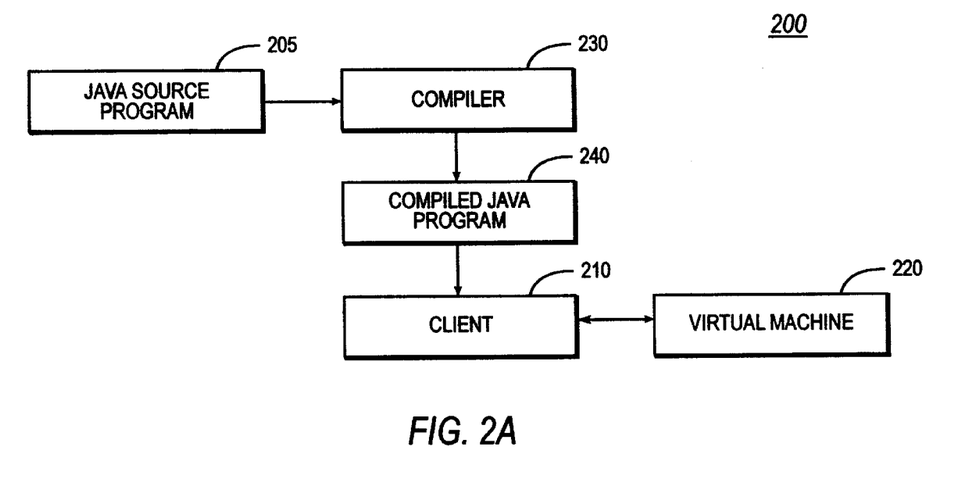
FIG. 2A is a block diagram of a Java development system.

Shown in further detail in FIG. 2A, a Java development system 200 of the present invention includes a client 210 which employs a virtual machine 220 for executing programs. In particular, the client 210 executes a "compiled" (i.e., bytecode or pseudo-compiled) Java program 240, which has been created by compiling a Java source code program or script 205 with a Java compiler 230. Here, the Java source code program 205 is an application program written in the Java programming language; the pseudo-compiled program 240, on the other hand, comprises the bytecode emitted by the compiler 230. The virtual machine 220 includes a runtime interpreter for interpreting the Java bytecode program 240. During operation, the client 210 simply requests the virtual machine 220 to execute a particular Java compiled program.

Figure 2B:
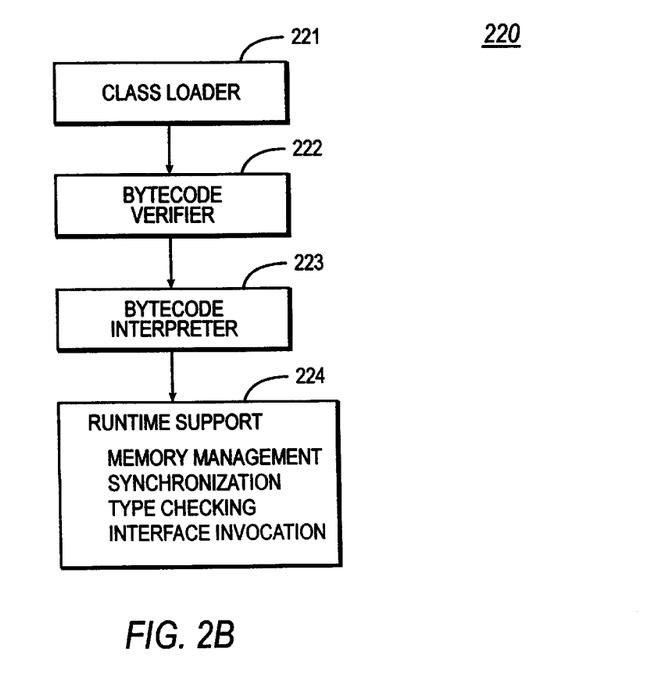
FIG. 2B is a block diagram showing further detail of the virtual machine of the Java development system of FIG. 2A.

As shown in FIG. 2B, the virtual machine 220 comprises a class loader 221, a bytecode verifier 222, a bytecode interpreter 223, and runtime support libraries 224. The class loader 221 is responsible for unpacking the class file which has been requested by a client. Specifically, the loader will unpack different sections of a file and instantiate in-memory corresponding data structures. The class loader will invoke itself recursively for loading any superclasses of the current class which is being unpacked.

The bytecode verifier 222 verifies the bytecode as follows. First, it checks whether the class has the correct access level. Since the class will access other classes for invoking their methods, the bytecode verifier must confirms that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These comprise the variables which are present only once (i.e., only one instance), for all objects of the class.

Runtime support libraries 224 comprise functions (typically, written in C) which provide runtime support to the virtual machine, including memory management, synchronization, type checking, and interface invocation. At the client, runtime support libraries 224 are included as part of the virtual machine; the libraries are not downloaded with the Java application. The bytecode which is executed repeatedly calls into the runtime support libraries 224, for invoking various Java runtime functions.

Improved Execution of Bytecode Programs with Just-In-Time Compilation

A. Introduction

Traditionally, compilers employ computationally-expensive optimizers for generating fast-executing machine code. For execution of an on-line Java application, however, such an approach is suboptimal. Simply put, there is little to gain by producing highly-optimized machine code, as much of the execution of a Java program occurs during execution of Java runtime support routines (e.g., memory management and graphical user interface libraries) in the virtual machine resident at the client. With a large percentage of execution occurring in the runtime or virtual machine, relatively little performance gain is realized by highly optimizing compiled application code. The approach of the present invention, therefore, is to just-in-time compile each method as it is used. Further, little or no optimization is employed, thereby improving the speed by which compiled code is generated and thus improving the speed by which the just-in-time compiled program executes.

The approach adopted by the present invention, therefore, is to compile each method on a "just-in-time" basis—that is, compile each method as it is actually used. Here, methods which are unused are left uncompiled. In a preferred environment, a method is compiled upon its first invocation. This holds true even if the method is known to execute only once. Even though a method may execute only once, it is possible that the method itself includes code which would benefit from compiling into native machine code; examples of such code include loops and other similar programming constructs. All subsequent use invokes the compiled version of the method.

B. Improved Development System with Just-In-Time Compiler

1. General

Figure 3:
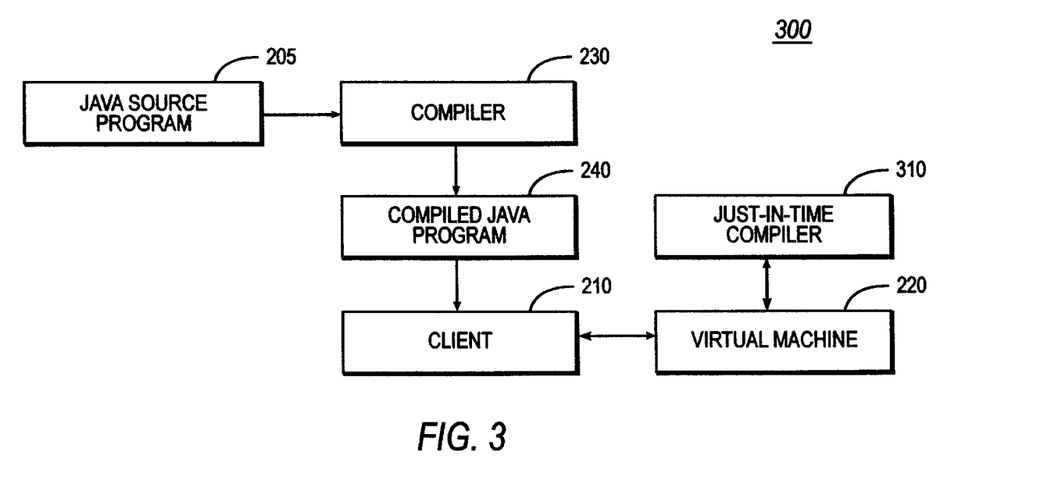
FIG. 3 is a block diagram showing modification of the Java development system of FIG. 2A to now include a just-in-time compiler of the present invention.

FIG. 3 illustrates an improved Java development environment or system 300, which is an enhanced implementation of the Java development system 200. Specifically, the system is modified to include a just-in-time compiler 310. In an exemplary environment, the just-in-time compiler 310 are indexed into the constant pool. Each method, on the other hand, comprise a method name and byte code (i.e., instructions).

Figure 4:
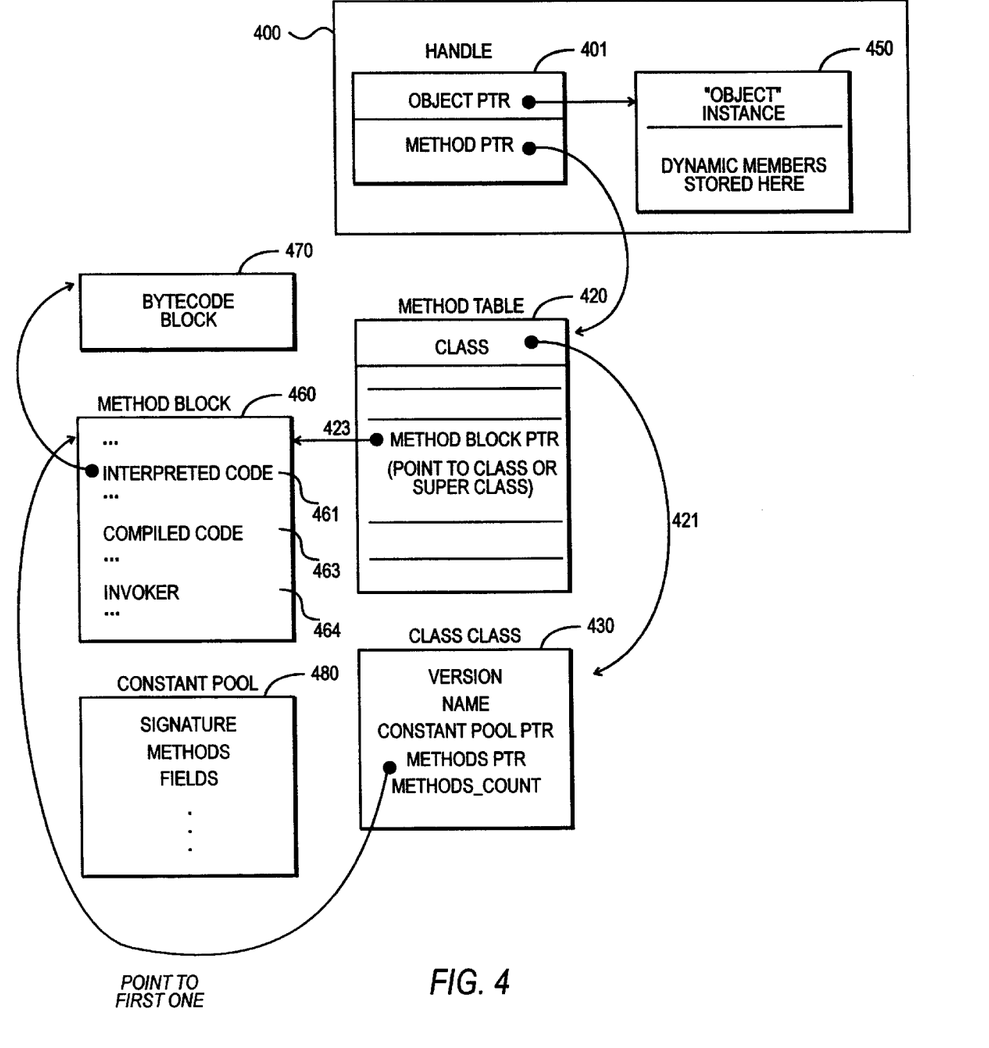
FIG. 4 is a block diagram illustrating runtime in-memory data structures unpacked from a class file.

At runtime, one or more objects are instantiated from classes. FIG. 4 illustrates the layout of a typical runtime object 400. The object 400 includes an object handle 401 which comprises a double indirection: a pointer to the object instance (void *obj) 450, and a pointer to method table (struct methodtable *methods) 420. The object instance represents the dynamic data—that is, data allocated dynamically at runtime for this particular object instance. The handles for the various objects are maintained in a global array for facilitating object processing, such as garbage collection.

As mentioned, the object handle 401 includes a pointer referencing a method table or virtual table ("v table"). Only one method table exists for each class. The method table 420, in turn, includes a list of methods for the objects of the class. Additionally, the method table 420 includes a pointer 421 pointing to a ClassClass descriptor 430, which is defined as follows (shown in familiar C Programming Language).

```
typedef struct ClassClass {
                /* Things following here are saved in the *class file */
                unsigned short              major_version;
                unsigned short              minor_version;
                char                        *name;
                char                        *super_name;
                char                        *source_name;
                struct Hjava_lang_Class     *superclass;
                struct Hjava_lang_Class     *HandleToSelf;
                HObject                     *loader;
                struct methodblock          *finalizer;
                union cp_item type          *constantpool;
                struct methodblock          *methods;
                struct fieldblock           *fields;
                short                       *implements;
                struct methodtable          *methodtable;
                struct fieldblock           **slottable;
                HArrayOfChar                *classname_array;
                unsigned long               thishash;
                unsigned long               totalhash;
                unsigned short              constantpool_count;     /* # of items in pool */
                unsigned short              methods_count;          /* number of methods */
                unsigned short              fields_1 count;         /* number of fields */
                unsigned short              implements_count;       /* number of protocols */
                unsigned short              methodtable_size;       /* size of meth. table */
                unsigned short              slottbl_size;           /* size of slottable */
                unsigned short              instance_size;          /* bytes of instance */
                unsigned short access;              /* how this class can be accesses */
                unsigned short flags;               /* see the Java CCF_* macros */
} ClassClass;
``` comprises a Dynamic Link Library (DLL) which is loaded at runtime by the virtual machine 220. When the virtual machine 220 loads for the first time, it loads the just-in-time compiler 3l. The client 2210, however, is not aware of the just-in-time compiler 3310. Before the just-in-time compiler 3310 is described in further detail, it is helpful first to examine Java objects in further detail, particularly object data structures which exist in memory at runtime.

2. Object Layout and Method Descriptors

When a Java application is executed, the virtual machine 220 loads one or more class files. Each class file, which comprises a stream of bytes, is "unpacked" upon loading. Each contains the following sections: constant pool, fields, and methods. The constant pool stores string and symbol information; all of the attributes of the fields and methods Here, information about the class is stored. Typical information includes class version, class name, and a pointer to a class constant pool. The constant pool (shown at 480), in turn, stores additional information describing the class, such as method signatures. The class descriptor also stores a pointer to the first one of the method blocks together with a count of the number of methods. The method blocks themselves are stored contiguously, as an array.

The method table 420 includes a pointer 423 to the method block for the class (or superclass, if this in an inherited class). One method block exists for each method of the class. Like other elements of a class, method blocks are unpacked from the class file. A method block is defined as follows.

```
struct methodblock {
        struct fieldblock fb;
        unsigned char          *code;              /* the code */
        /*
        Not of interest
        struct CatchFrame      *exception_table;
        struct lineno          *line_number_table;
        struct localvar        *localvar_table;
        unsigned long          code_length;
        unsigned long          exception_table_length;
        unsigned long          line_number_table_length;
        unsigned long          localvar_table_length;
        */
        bool_t (*invoker)
        (JHandle *o, struct methodblock *mb, int args_size, struct execenv *ee);
        unsigned short args_size;       /* total size of all arguments */
        unsigned short maxstack;        /* maximum stack usage */
        unsigned short nlocals;         /* maximum number of locals */
        void *CompiledCode;             /* its type is machine dependent */
        long CompiledCodeFlags;         /* machine dependent bits */
};
```

As shown above, the method block includes a nested structure, a fieldblock.

```
/* User specifiable attributes */
#define ACC_PUBLIC              0x0001     /* visible to everyone */
#define ACC_PRIVATE             0x0002     /* visible only to the defining class */
#define ACC_PROTECTED           0x0004     /* visible to subclasses */
#define ACC_STATIC              0x0008     /* instance variable is static */
#define ACC_FINAL               0x0010     /* no further subclassing, overriding */
#define ACC_SYNCHRONIZED        0x0020     /* wrap method call in monitor lock */
#define ACC_THREADSAFE          0x0040     /* can cache in registers */
#define ACC_TRANSIENT           0x0080     /* not persistant */
#define ACC_NATIVE              0x0100     /* implemented in C */
#define ACC_INTERFACE           0x0200     /* class is an interface */
#define ACC_ABSTRACT            0x0400        /* no definition provided */
#define ACC_XXUNUSED1           0x0800     /*   */
#define ACC_WRITTEN_FLAGS       0x0FFF     /* flags actually put in .class file */
/* Other attributes */
#define ACC_VALKNOWN            0x1000     /* constant with known value */
#define ACC_DOCED               0x2000     /* documentation generated */
#define ACC_MACHINE_COMPILED    0x4000     /* compiled to machine code */
#define ACC_XXUNUSED3           0x8000     /*   */
```

```
struct fieldblock {
        struct ClassClass *clazz;
        char *signature;
        char *name;
        unsigned long ID;
        unsigned short access;
        /*
        Not of interest
        union {
            unsigned long offset;    /* info of data */
            OBJECT static_value;
            void *static_address;
        } u;
        */
};
```

The fieldblock includes a pointer (*clazz) to the class descriptor (ClassClass). This is followed by pointers to a signature (*signature) and a name (*name), and by an ID (ID). Of particular interest is access. This characterizes the access of the field as follows.

Following the fieldblock are a number of slots storing pointers. First is a pointer to the bytecode, *code. This corresponds to the interpreted code slot 461, shown in FIG. 4, which points to bytecode block 470. Next is a function pointer to an invoker, *invoker. This corresponds to the invoker slot 464. This slot stores a function pointer which is used by the Java interpreter to call a method, when calling from interpreted code. Two types of methods are supported: "normal" method and "synchronized" method. The latter is protected by a monitor, for preventing simultaneous execution of a particular method by different threads. In effect, a "lock" is employed for providing exclusive access to a particular method.

The third slot stores a pointer (e.g., 32-bit address pointer) to compiled code, *CompiledCode, which corresponds to the compiled code slot 463. The pointer is used in conjunction with a machine-dependent flags, CompiledCodeFlags. As originally designed, the compiled code slot 463 stores a pointer to code which had been pre-compiled for the class (i.e., native code already stored in the class file). As described below, this design is modified to support just-in-time compilation and execution of methods.

3. Method Blocks with Modified Slots and Callback Stubs

A method (caller) calling another method (callee) should not have to know whether it is calling is an interpreted method or a compiled method. In particular, it would be inefficient to include a runtime test for making this determination. Further, it would be inefficient to patch all calling sites to a particular method (i.e., call instructions to the method located in various callers) when the method is compiled. Accordingly, the sytem of the present invention employs modified calling slots in the method block of each method for effecting calls through callback stubs or direct pointers. Here, "stubs" are functions which contain little code, other than serving as a placeholder for calling on to another function or method. "Callback" refers to a type of function or method which has registered its address (e.g., function pointer) so that it will be called back into upon de-referencing of the registered address (e.g., upon occurrence of a particular condition).

Figure 5:
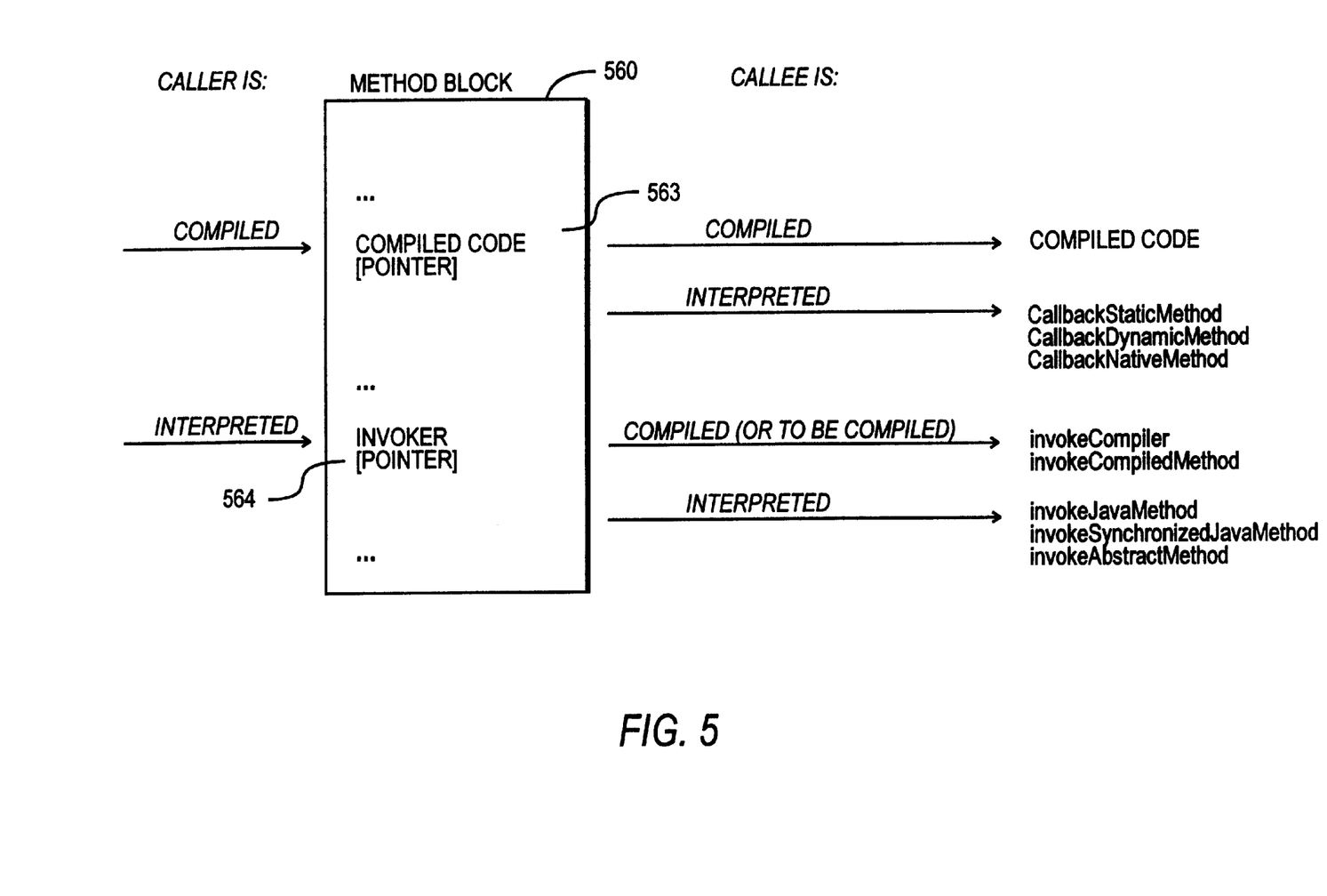
FIG. 5 is a block diagram illustrating use of a compiled code slot and an invoker slot for executing methods.

In accordance with the present invention, the method blocks of methods are modified for use with the just-in-time compiler, as shown in FIG. 5. For method block 560, for example, use of its two slots are adapted as follows. First, the invoker slot 564 (corresponds to invoker 464 of FIG. 4) is employed from all calls from an interpreted caller (or the runtime interpreter) to the callee method (i.e., the method associated with the method block 560). When the method is compiled, the invoker slot 564 is updated so that, for subsequent calls, the compiled code for the method is executed. Ordinarily, the invoker slot stores a pointer to one of the following callback stub functions: invokeJavaMethod, invokeSynchronizedJavaMethod, invokeAbstractMethod, or invokeLazyNativeMethod. This is extended to also include the following new stub functions: invokeCompiler and invokeCompiledMethod. The invokeCompiler stub address is stored in the invoker slot when the method has yet to be compiled (and compilation has not be disabled). After a method has been compiled, the slot stores the address of the invokeCompiledMethod stub. Thereafter, calls from an interpreted caller to the method will results in invocation of the compiled version of the method, via the invoke CompiledMethod stub.

In the case of calling from compiled code with compilation enabled, the "compiled code" slot 563 (corresponds to compiled code slot 463 of FIG. 4) is employed. The compiled code slot stores either a pointer to the compiled code of the callee method or, if no compiled code exists, a pointer to an invokeCompiler handler for compiling the callee method. If, on the other hand, compilation is disabled, the slot stores callback stubs which correspond to the "static," "dynamic," and "native" Java methods: CallbackStaticMethod, CallbackDynamicMethod, and CallbackNativeMethod. These stubs call back into the Java runtime interpreter for interpretation of the callee method.

Stated generally, therefore, when calling from interpreted code, the system employs the invoker slot 464; when calling from compiled code, the system uses compiled code slot 463. Since the addresses for the slots themselves remain unchanged (as opposed to the address or pointer which each stores), there is no need to patch callers to a method (i.e., at the calling sites) when the method is compiled. As a particular advantage, therefore, the code of any callers to the method need not be modified. In this manner, a method (caller) calling another method (callee) does not have to know whether it is calling is an interpreted method or a compiled method.

4. Slot Management

The compiled code slot and the invoker slot are managed by the following functions: compileAndGoOnInvoke, goOnInvoke, and interpretOnInvoke. Collectively, these methods assume responsibility for storing appropriate addresses or pointers in the slots—that is, registering the correct callback stub or pointer to compiled code with each slot. The compileAndGoOnInvoke function takes a particular method as its argument. Once called, the function initializes the invoker slot to guarantee that the method will be compiled for the first time (or recompiled) and executed natively (i.e., as machine code) when invoked next. The goOnInvoke function takes as its arguments the method and the address of the compiled code. As a result of this call, the corresponding method will be executed natively with the code at the given address, when the method is invoked next. The interpretOnInvoke function takes as its single parameter the method. Upon calling this function, the method will be interpreted the next time it is invoked. By providing this function, the system can switch back and forth between calling a particular method as interpreted code or compiled code, without having to recompile code.

5. Runtime Execution

At runtime, after a class is loaded by the virtual machine and the invoker slots of all the methods of the class have been initialized, the virtual machine calls InitializeForCompiler—a special hook or callback which the just-in-time compiler has installed in the virtual machine. Since the invoker slots for the methods have been initialized by the virtual machine, the InitializeForCompiler function completes the initialization by calling compileAndGoOnInvoke on all methods (unless the compiler has been disabled). In the event that the compiler has been disabled, the InitializeForCompiler function will instead call interpretOnInvoke on all methods. At the completion of initialization, the invoker slot stores the address of the invokeCompiler stub.

When a method is called at runtime through the invoker slot (i.e., the caller is interpreted method or the Java runtime interpreter), the invokeCompiler stub is called to compile the method (since, at this point, the invokeCompiler pointer is stored in the invoker slot). This leads to invocation of the goOnInvoke function, with the address of the just-compiled code. Afterwards, the invokeCompiledMethod pointer is stored in the invoker slot; compiled code slot is updated with a pointer to the compiled code. Subsequent calls to the method (from a non-compiled caller) will invoke the compiled code via the invokeCompiledMethod stub.

In the event that the caller method is compiled code (i.e., caller method is compiled), the compiled code slot is employed instead. If the callee method is also compiled, the compiled code slot stores a pointer to a memory block which comprises the just-in-time compiled code for the method; this is an optimization which allows direct invocation of the callee method's compiled code from the caller's compiled code. Here, the caller calls into a method's true-compiled machine code—that is, native machine code for a target processor (e.g., Intel 80×86 machine code)—without having to go back through the interpreter or through a stub. Once execution of the callee method has completed, control is returned directly to the caller (method), not to the Java interpreter. In this manner, calling from one compiled method to another is very fast; only a single address (pointer) need be dereferenced.

In the instance where the callee method is not compiled, the compiled code slot stores a callback stub or wrapper function in order to jump back into interpreted code. Here, the compiled code slot stores an address or pointer to one of the previously-mentioned callbacks into the interpreter: CallbackStaticMethod, CallbackDynamicMethod, and CallbackNativeMethod. At initialization, the compiled code slot stores a callback pointer into the interpreter, since the callee method is not yet compiled at that point. When calling from compiled code to non-compiled code, the system encounters two levels of indirection. First, the compiled code calls back into the Java interpreter (via one of the above callbacks).

Second, the interpreter calls into the non-compiled method using the invoker slot, which can, in turn, invoke invokeCompiler (in the manner previously described).

Detailed Construction and Operation of Slot Management Functions

A. compileAndGoOnInvoke

In an exemplary environment, the compileAndGoOnInvoke function may be constructed as follows (using the C programming language).

```
1:    /* Modify the V-table for mb, so that mb is compiled
2:     * and executed natively the next time it is invoked.
3:     */
4:    bool_t compileAndGoOnInvoke(struct methodblock *mb)
5:    {
6:            unsigned int access;
7:            bool_t res;
8:
9:            INVOKER_LOCK();
10:           access = mb->fb.access;
11:           if ((access & (ACC_ABSTRACT | ACC_NATIVE)) == 0)
12:           {
13:               res = TRUE;
14:               mb->invoker = invokeCompiler;
15:               // old compiled code will be garbage collected
16:               mb->CompiledCode = (access & ACC_STATIC) ?
17:                       &CallbackStaticMethod : &CallbackDynamicMethod;
18:
19:               mb->fb.access &= ~ACC_MACHINE_COMPILED;
20:           }
21:           else if (access & ACC_ABSTRACT)
22:           {
23:               res = FALSE;
24:               // mb->invoker initialized to invokeAbstractMethod in the VM.
25:               mb->CompiledCode = (access & ACC_STATIC) ?
26:                       &CallbackStaticMethod : &CallbackDynamicMethod;
27:           }
28:           else
29:           {
30:               res = FALSE;
31:               // mb->invoker initialized to invokeLazyNativeMethod in the VM.
32:               inb->CompiledCode= &CallbackNativeMethod;
33:           }
34:           INVOKER_UNLOCK();
35:           return res;
36:    }
```

(line numbers added for clarity of description)

As shown, the function is invoked with a single parameter: a method block pointer, *mb. Initially, at line 9, the method takes out a lock, since it is accessing shared data structures (i.e., method block slots) in a multi-threaded environment. At line 11, the method tests the access type specified for the method (from the method block). The typical case is where the method is not abstract and not native (i.e., "yes" at line 11). In such a case, the return result (res) is set equal to "true," at line 13. At line 14, the invokeCompiler stub address is stored in the invoker slot. The next time the method is invoked, it will be first compiled. At line 16, the CompiledCode slot is also initialized to one of the previously described callback stubs, callbackStaticMethod or callbackDynamicMethod (depending on whether the method is static or dynamic). At line 19, the method is marked as not compiled (yet). This is done to force a re-compilation of the code, in the event that the code is already once compiled.

Lines 21–27 represent steps for processing an abstract method. If a method is an "abstract" method, it cannot be compiled as it has no code. In such a case, the result is set equal to FALSE at line 23. At line 25, the compiled code slot is initialized in a manner similar to that described for line 16. Here, a call from a compiled method will evoke a stub, which, in turn, calls back into the interpreter.

In a similar manner, lines 28–33 handle the case of a native method. A "native" method is a method previously-compiled which is employed when calling lower-level functions, such as operating system functions. These methods, which are not compiled from Java source code, are specially marked in the class file. When invoked at runtime, they are typically loaded from a Dynamic Link Library (DLL). At line 30, the compile result (res) is set equal to FALSE at line 30. At line 32, the CompiledCode slot stores the address of the callbackNativeMethod stub. Finally, at line 34, the lock is released and, at line 35, the result is returned.

B. invokeCompiler

In an exemplary environment, the invokeCompiler function may be constructed as follows:

```
1:  bool_t invokeCompiler(JHandle *o, struct methodblock *mb,
2:       int args_size, ExecEnv *ee)
3:  {
4:       unsigned char *compiledCode;
5:       bool_t res;
6:       res = jitCompile(mb, (void **)&compiledCode, ee);
7:       if (res)
8:            goOnInvoke(mb, compiledCode);
9:       else
10:           // could not compile, do not try again at next invocation
11:           interpretOnInvoke (mb);
12:
13:      return mb->invoker(o, mb, args_size, ee);
14: )
```

As shown, the function attempts at the outset to compile the method by calling a subroutine, jitCompile, at line 6. The address of the compiled code is stored in compiledCode. If, for any reason, the compilation fails, this variable is set equal to NULL. If the compilation process is successful, the function calls goOnInvoke, at line 8, for setting the invoker and compiled code slots. Otherwise (i.e., "no" at line 8), the function calls interpretOnjnvoke. This subroutine call sets the invoker and compiled code slots for interpretation of the method.

Up until this point, the target method itself has not been invoked. At line 13, therefore, the method is actually invoked by a subroutine call to invoker. This, in turn, undertakes actual invocation of the method, whether compiled or interpreted. The result of the subroutine call is returned as the result of the invokeCompiler function.

called from compiled code, the compiled code slot stores a direct pointer to that code. At line 5, the compiled code slot is set to the address of the compiledCode stub. This is followed by setting the access flag for the method block to "compiled." Finally, the lock is released at line 7, whereupon the function returns.

D. interpretOnInvoke

In an exemplary environment, the interpretOnInvoke function may be constructed as follows:

```
1:    /* Modify the V-table for mb, so that mb is interpreted
2:     * the next time it is invoked.
3:     */
4:    bool_t interpretOnInvoke(struct methodblock *mb)
5:    {
6:        unsigned int access;
7:        *bool_t res;
8:
9:        INVOKER_LOCK( );
10:       access = mb->fb.access;
11:       if ((access & (ACC_ABSTRACT | ACC_NATIVE)) == 0)
12:       {
13:           res = TRUE;
14:           mb->invoker = (access & ACC_SYNCHRONIZED) ?
15:                   &invokeSynchronizedJavaMethod : &invokeJavaMethod;
16:
17:           // old compiled code will be garbage collected
18:           mb->CompiledCode = (access & ACC_STATIC) ?
19:                   &CallbackStaticMethod : &CallbackDynamicMethod;
20:
21:           mb->fb.access &= ~ACC_MACHINE_COMPILED;
22:       }
23:       else if (access & ACC_ABSTRACT)
24:       {
25:           res = FALSE;
26:           // mb->invoker initialized to invokeAbstractMethod in the VM.
27:           mb->CompiledCode = (access & ACC_STATIC) ?
28:                   &CallbackStaticMethod : &CallbackDynamicMethod;
29:       }
30:       else
31:       {
32:           res = FALSE;
33:           // mb->invoker initialized to invokeLazyNativeMethod in the VM.
34:           mb->CompiledCode = &CallbackNativeMethod;
35:       }
36:       INVOKER_UNLOCK();
37:       return res;
38:   }
```

C. goOnInvoke

In an exemplary environment, the goOnInvoke function may be constructed as follows:

```
1:  void goOnInvoke(struct methodblock *mb, void *compiledCode)
2:  {
3:      INVOKER_LOCK();
4:      mb->invoker = invokeCompiledMethod;
5:      mb->CompiledCode = compiledCode;
6:      mb->fb.access | = ACC_MACHINE_COMPILED;
7:      INVOKER_UNLOCK();
8:  }
```

Recall that this function is invoked by the just-described invokeCompiler function. Accordingly, it is invoked with the address of the compiledCode, which is passed in as a parameter to the function. At line 3, a lock is asserted. At line 4, the invoker slot is set to the address of the invokeCompiledMethod stub. In the event that the method is invoked from interpreted code, this represents a stub which will jump into the compiled code. On the other hand, if the method is called from compiled code, the compiled code slot stores a direct pointer to that code. At line 5, the compiled code slot is set to the address of the compiledCode stub. This is followed by setting the access flag for the method block to "compiled." Finally, the lock is released at line 7, whereupon the function returns.

The interpretOnInvoke function is similar in design to that of the previously-described compileAndGoOnInvoke function. The interpretOnInvoke function sets the slots for interpreting the method. Specifically, for the regular case (i.e., not abstract and not native—tested at line 11), the function sets the invoker slot to the invokeJavaMethod callback stub (or invokeSynchronizedJavaMethod if access is synchronized). At line 18, the compiledCode slot is set to the callbackStaticMethod stub for a static method, or callbackDynamicMethod for a dynamic method. The "compiled" flag is cleared at line 21.

In the event that the method is abstract, the function simply completes initialization at lines 27–28 (in a manner identical to lines 25–26 of the compileAndGoOnInvoke function). Similarly, for a native method, the function completes initialization at line 34 (which corresponds to line 32 of the compileAndGoOnInvoke function). The method concludes by releasing the lock at line 36. Then, the result is returned at line 37.

E. compilerEnable and compilerDisable

Additional functions are provided for facilitating enabling and disabling of compiling: CompilerEnable and CompilerDisable. Each is described in turn.

In an exemplary environment, the CompilerEnable function may be constructed as follows.

```
1:    void CompilerEnable(void)
2:    {
3:            struct methodblock *mb;
4:            ClassClass *cb;
5:
6:            lock_classes( );
7:            for ( /* all loaded classes cb */
8:            {
9:                    mb = cb->methods;
10:                   for (int size = 0; size < (int)cb->methods_count; size++, mb++)
11:                           compileAndGoOnInvoke (mb);
12:           }
13:           CompilerEnabled = TRUE;
14:           unlock_classes( );
15:   }
```

In operation, the function sets up a double "for" loop for looping through all methods of all loaded classes. For each of these methods, the function invokes compileAndGoOnInvoke, at line 11. The global flag CompilerEnable is set to TRUE, at line 13.

The CompilerDisable function, on the other hand, may be constructed as follows.

```
1:    void CompilerDisable(void)
2:    {
3:            struct methodblock *mb;
4:            ClassClass *cb;
5:
6:            lock_classes( );
7:            for ( /* all loaded classes cb */
8:            {
9:                    mb = cb->methods;
10:                   for (int size = 0; size <(int)cb->methods_count; size++, mb++)
11:                           interpretOnInvoke (mb);
12:           }
13:           CompilerEnabled = FALSE;
14:           unlock classes( );
15:   }
```

Again, a double "for" loop is established, for looping through all methods of all loaded classes. Instead of calling compileAndGoOnlnvoke, however, the function calls interpretOnInvoke, at line 11. As a result, all methods from this point on will instead be interpreted. Accordingly, the global flag compilerEnable is set to FALSE, at line 13.

F. Overall Execution of Just-In-Time Compiled Methods

Figure 6:
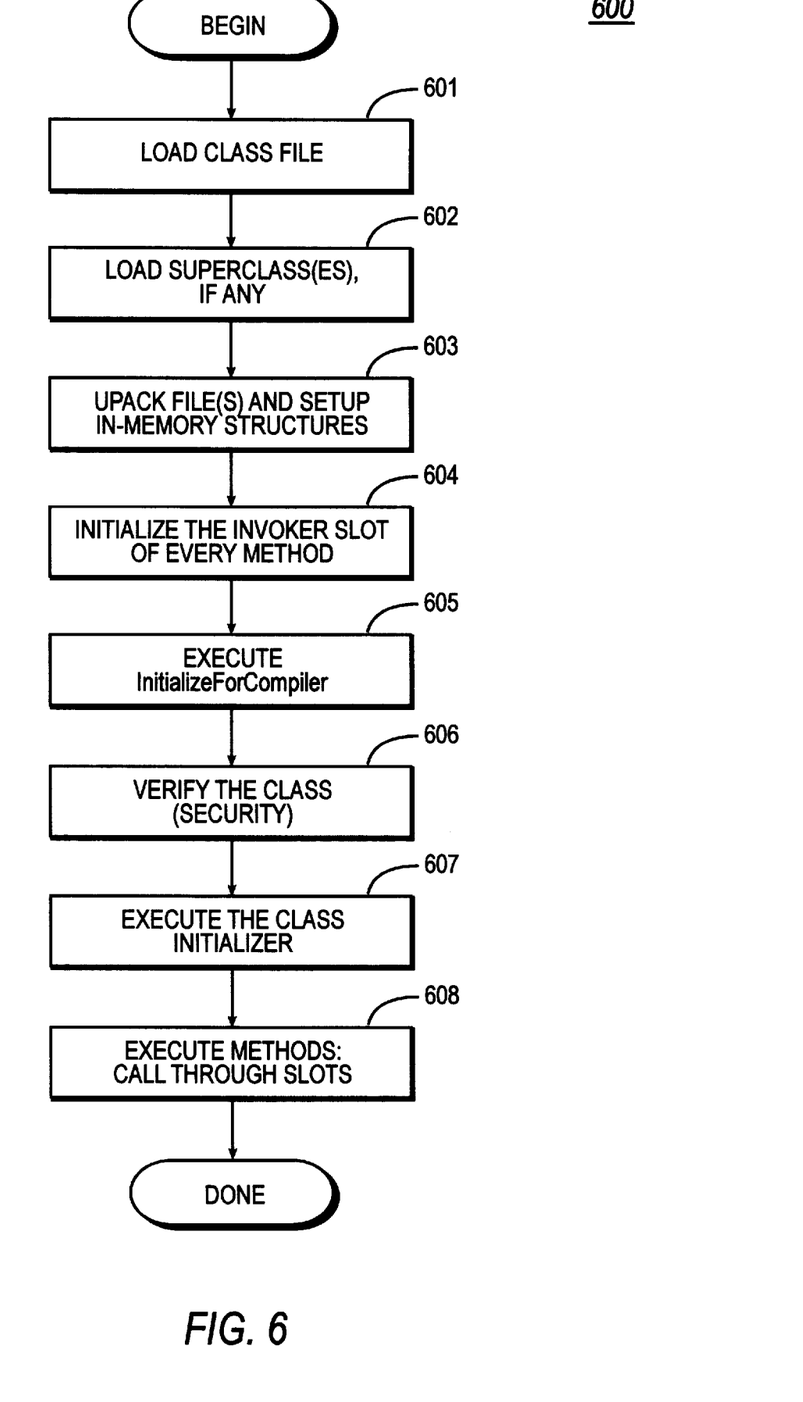
FIG. 6 is a block diagram illustrating an overall method for executing Java applications with just-in-time compiling of methods, as each method is first invoked.

Referring now to FIG. 6, a computer-implemented process 600 for executing methods with just-in-time compilation will be described. At step 601, the class file is loaded from storage. At step 602, superclasses for the class, if any, are also loaded (by executing steps 601–607 in a recursive manner). At step 603, the process unpacks the files and sets up in-memory structures, including method blocks, ClassClass blocks, and the like.

At step 604, the invoker slot of every method is initialized. This is followed by execution of the initializeForCompiler function which finishes the initialization, at step 605. At step 606, the bytecode for the class is verified. At step 607, the process runs the class initializer. Since the class initializer is itself a method (with a special name), its invocation leads to execution of the invokeCompiler function, even though the class initializer is invoked only once. The invokeCompiler function will, in turn, compile the class initializer just prior to that method's execution.

At step 608, the first method is executed with just-in-time compilation, by calling through its invoker slot as previously described. The method may call other methods and so forth and so on. With just-in-time compilation enabled, each method called is compiled at the point when it is first invoked. Methods which are not executed are left uncompiled. When a method is compiled, its call(s) to another (callee) method is compiled into a machine code call instruction to an address pointed to by the compiled code slot of the callee. If the callee is already compiled, direct execution of machine instructions for the callee occurs. Otherwise, the invokeCompiler handler is called upon to compile the callee method; thereafter, future calls from compiled code to the callee method proceed with direct execution of machine instructions for the callee.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system for executing a program comprising a plurality of methods compiled into bytecode for interpretation at runtime by a runtime interpreter, a method for improving runtime execution of said program comprising:

creating a compiled code slot in memory which is associated with a particular method, said compiled code slot for storing a pointer to a memory address;

initializing the compiled code slot to store a pointer to a handler, said handler for invoking compilation of said particular method;

upon first invocation of the particular method, invoking said handler for performing substeps comprising:
(i) compiling said particular method into a compiled method comprising native machine code for a target microprocessor, including mapping bytecode for a method being called into native machine code for execution by a target microprocessor,
(ii) storing in the compiled code slot a pointer to said compiled method, including generating a machine code call instruction for transferring execution of the program to said compiled method that is located at a memory address pointed to by the pointer stored in said compiled code slot, so that the particular method can be accessed by a method which is itself compiled into native machine code for the target microprocessor, and
(iii) executing said particular method by executing the compiled method comprising native machine code for the target microprocessor; and
upon subsequent invocation of the particular method by a method which is itself compiled into native machine code for the target microprocessor, executing said particular method by executing the compiled method which is pointed to by the pointer stored in the compiled code slot for said particular method.

2. The method of claim 1, wherein said program comprises a program initially pseudo-compiled into Java bytecode format.

3. The method of claim 1, wherein said compiled code slot stores a 32-bit function pointer.

4. The method of claim 1, wherein said handler functions to invoke a just-in-time compiler for compiling said particular method upon said particular method's initial invocation.

5. The method of claim 1, wherein said target microprocessor comprises an Intel-compatible 80×86 microprocessor.

6. The method of claim 5, wherein said native machine code comprises machine instructions for an Intel-compatible 80×86 microprocessor.

7. The method of claim 1, wherein said methods of said program are only compiled into native machine code when each method is first invoked.

8. The method of claim 1, wherein a call from said another method to said particular method comprises a method call through the pointer stored by the compiled code slot.

9. The method of claim 1, wherein said handler invokes said runtime interpreter for interpreting said particular method if compilation has been disabled for methods.

10. The method of claim 1, wherein compiling said particular method comprises:
allocating a memory block and compiling said particular method as a true compiled method stored at said memory block.

11. In a development system for creating a program having methods comprising bytecode for interpretation by a runtime interpreter, an improved method for executing said program comprising:
initializing a pointer associated with each method to point to a handler for invoking compilation of said each method;
as each method is called at runtime, compiling each called method into native machine code stored at a particular location in memory, including mapping bytecode for a method being called into native machine code for execution by a target microprocessor, and storing said particular location for the called method in the pointer associated with the called method;
as each method is compiled, for any bytecode instruction which comprises a call to another method, generating a native machine code call instruction to a memory address pointed to by the pointer associated with said another method, including generating a machine code call instruction for transferring execution of the program to code located at a memory address pointed to by the pointer associated with said another method; and
executing said program wherein a call through a pointer pointing to said handler invokes compilation of the method associated with the pointer, and wherein a call through a pointer pointing to a method which has already been compiled leads to execution of the native machine code for the method associated with the pointer.

12. The method of claim 11, wherein said native machine code comprises machine instructions for an Intel-compatible 80×86 microprocessor.

13. The method of claim 11, wherein said bytecode comprises bytecode for execution by a platform-neutral virtual machine.

14. The method of claim 13, wherein said virtual machine comprises a Java runtime interpreter.

15. The method of claim 11, wherein each pointer comprises a 32-bit memory address pointing to a particular location in system memory.

16. The method of claim 11, wherein said handler calls back into the runtime interpreter if compilation of the program has been disabled.

17. The method of claim 11, wherein said program comprises a program initially pseudo-compiled into Java bytecode format.

18. The method of claim 17, wherein each method of said program which has been pseudo-compiled is only compiled into native machine code when it is first invoked.

19. In a computer system for creating a Java program having methods for execution by a runtime interpreter, a method having an improvement for executing said Java program, the improvement comprising:
compiling each method only when each method is first invoked at runtime, including mapping bytecode for each method being called into native machine code for execution by a target microprocessor; and
for each method which is compiled and includes a call invoking another method, generating a call instruction through a pointer associated with said another method being called, including generating a machine code call instruction for transferring execution of the program to code located at a memory address pointed to by the pointer associated with said another method, said pointer storing a memory address for said another method if said another method has been compiled; otherwise, said pointer storing a memory address for a handler which compiles said another method into compiled machine code for execution by a target microprocessor when said other method is actually executed at runtime.

20. The method of claim 19, wherein said compiling step comprises:
mapping a method being called from bytecode into native machine code for execution by a target microprocessor.

21. The method of claim 20, wherein said bytecode comprises Java-compatible bytecode and wherein said native machine code comprises Intel-compatible 80×86 machine code.

22. The method of claim 19, wherein said pointer associated with said another method being called comprises a 32-bit pointer referencing a memory location for said another method.

23. The method of claim 19, wherein said compiling step includes:

compiling each method into native machine code stored at a memory location; and maintaining an address for each memory location where each method has been compiled as a pointer stored in a descriptor associated with each particular method which has been compiled.

* * * * *